US012126101B2

(12) United States Patent
Blakborn et al.

(10) Patent No.: US 12,126,101 B2
(45) Date of Patent: Oct. 22, 2024

(54) CABLE ASSEMBLY AND METHOD FOR PRODUCING AN ELECTRIC AND MECHANICAL CONNECTION

(71) Applicant: Rosenberger Hochfrequenztechnik GmbH & Co. KG, Fridolfing (DE)

(72) Inventors: Willem Blakborn, Inzell (DE); Maximilian Metzenleitner, Traunstein (DE)

(73) Assignee: Rosenberger Hochfrequenztechnik GmbH & Co. KG, Fidolfing (DE)

( * ) Notice: Subject to any disclaimer, the term of this patent is extended or adjusted under 35 U.S.C. 154(b) by 1040 days.

(21) Appl. No.: 16/977,641

(22) PCT Filed: Mar. 11, 2019

(86) PCT No.: PCT/EP2019/056011
§ 371 (c)(1),
(2) Date: Sep. 2, 2020

(87) PCT Pub. No.: WO2019/175097
PCT Pub. Date: Sep. 19, 2019

(65) Prior Publication Data

US 2021/0050681 A1 Feb. 18, 2021

(30) Foreign Application Priority Data

Mar. 15, 2018 (DE) ..................... 10 2018 106 033.5

(51) Int. Cl.
*H01R 11/11* (2006.01)
*H01R 11/09* (2006.01)
(Continued)

(52) U.S. Cl.
CPC .............. *H01R 11/11* (2013.01); *H01R 11/09* (2013.01); *H01R 43/0214* (2013.01); *H01R 43/0249* (2013.01); *H01R 4/021* (2013.01)

(58) Field of Classification Search
CPC ..... H01R 11/09; H01R 11/11; H01R 43/0214; H01R 43/0249; H01R 4/021
(Continued)

(56) References Cited

U.S. PATENT DOCUMENTS 5,191,710 A 3/1993 Fujimaki
5,517,755 A * 5/1996 Wright .................. H01R 4/024 29/843
(Continued)

FOREIGN PATENT DOCUMENTS

DE 19956193 A1 6/2001
DE 102006029323 A1 12/2007
(Continued)

OTHER PUBLICATIONS

PCT-Request, PCT/EP2019/056011, Mar. 11, 2019.
(Continued)

*Primary Examiner* — William H. Mayo, III
(74) *Attorney, Agent, or Firm* — Randall Danskin P.S.

(57) ABSTRACT

A cable assembly having at least three electric cables which have electric conductors that are electrically and mechanically connected together. Each of the electric conductors is free of an insulation material and is plate-shaped in a contact point. One of the cables is a carrier cable, and the electric conductor of the carrier cable is formed as a support plate at the contact point in order to attach the contact points of the other electric conductors. Multiple contact points of the other electric conductors are secured to a surface of the support plate next to one another.

22 Claims, 4 Drawing Sheets

(51) Int. Cl.
*H01R 43/02* (2006.01)
*H01R 4/02* (2006.01)

(58) Field of Classification Search
USPC ...... 174/74 R, 78, 79, 84 R, 88 R, 90, 91 R, 174/92, 93
See application file for complete search history.

(56) References Cited

U.S. PATENT DOCUMENTS

| | | | | |
|---|---|---|---|---|
| 9,281,099 | B2 * | 3/2016 | Terasaka | H01R 43/0207 |
| 2006/0121773 | A1 | 6/2006 | Ichikawa | |
| 2016/0155538 | A1 * | 6/2016 | Karlen | H01R 43/0263 174/70 R |

FOREIGN PATENT DOCUMENTS

| | | | | | |
|---|---|---|---|---|---|
| EP | 1850420 | A2 | | 10/2007 | |
| EP | 1973200 | A1 | | 9/2008 | |
| EP | 2672569 | A | * | 6/2013 | H01R 4/62 |
| FR | 2906087 | A1 | * | 3/2008 | H01R 4/02 |
| JP | S63198275 | A | | 8/1988 | |
| JP | WO2012/060466 | A1 | * | 10/2012 | H01R 4/02 |
| WO | 2019/175097 | A1 | | 9/2019 | |

OTHER PUBLICATIONS

International Search Report and Written Opinion of the International Searching Authority, PCT/EP2019/056011, Jun. 4, 2019.
German Search Report dated Mar. 1, 2019.
PCTIB/301/304/308, PCT/EP2019/056011.

* cited by examiner

CABLE ASSEMBLY AND METHOD FOR PRODUCING AN ELECTRIC AND MECHANICAL CONNECTION

CROSS REFERENCE TO RELATED APPLICATIONS

This application is a national stage application of International App. No. PCT/EP2019/056011, filed on 11 Mar. 2019 and titled "Cable Assembly and Method for Producing an Electric and Mechanical Connection," which claims the benefit of priority to earlier filed German Patent Application No. DE 10 2018 106 033.5, filed on 15 Mar. 2018, both of which are hereby incorporated by this reference in their entirety.

BACKGROUND AND SUMMARY

The invention relates to a cable arrangement, comprising at least three electrical cables.

The invention also relates to a method for producing an electrical and mechanical connection between at least three electrical cables of a cable arrangement.

The invention moreover relates to a vehicle.

In electrical engineering, it is known to mostly use electrical plug connectors to electrically connect electrical cables to one another.

However, in practice, the use of electrical plug connectors is not always possible or is sometimes unsuitable. For example, in terms of their robustness and the safety of the plug connection, high requirements are imposed on plug connectors for the automobile industry, in particular for connecting electrical high voltage cables. The plug connectors must withstand high loads, for example mechanical loads or thermal loads, and remain closed in a defined manner so that the electrical connection is not inadvertently disconnected. To meet the requirements, such plug connectors will sometimes be correspondingly large and heavy due to their application; furthermore, the production and assembly costs can be comparatively high. This applies, in particular, when more than two electrical cables are to be connected to one another.

To avoid using complex and expensive plug connectors, cable connections have become known, particularly for use in the high voltage area of the automobile industry, in which the electrical conductors of a plurality of cables are electrically and mechanically connected in a non-releasable manner via an electrically conductive carrier plate. To this end, the electrical conductors to be connected are welded to the carrier plate. Such carrier plates are mostly formed from copper and are therefore correspondingly expensive. In high voltage applications, a solid busbar adapter is conventionally used.

The present invention is based on the object of further improving the known cable arrangements of the prior art, in particular of reducing the costs for the cable connection.

The present invention is also based on the object of providing an improved method for producing an electrical and mechanical connection between at least three electrical cables.

The advantageous embodiments and variants of the invention are described and follow herein.

The cable arrangement according to the invention comprises at least three electrical cables, which have electrical conductors which are electrically and mechanically connected to one another, wherein the electrical conductors are each freed of an insulation material and shaped in the form of a plate at a contact point.

According to the invention, one of the cables is configured as a carrier cable and the electrical conductor of the carrier cable is formed as a carrier plate at the contact point for connecting the contact points of the further electrical conductors, wherein a plurality of contact points of the further electrical conductors are fastened next to one another on a surface of the carrier plate.

The cable arrangement may comprise any number of electrical cables, such as but not limited to three cables, four cables, five cables, six cables, seven cables, eight cables, nine cables, ten cables or more cables.

Due to the electrical conductor of the carrier cable being formed as a carrier plate at the contact point for connecting the contact points of the further electrical conductors, the electrical conductors can be combined particularly easily and reliably without the need for an additional carrier plate. By using the electrical conductor of the carrier cable as a carrier plate, it is ensured that the carrier plate is suitably electrically conductive. In this case, in the region of its contact point which forms the carrier plate, known measures can be used to convert the electrical conductor of the carrier cable into a plate-shaped, preferably flat form having virtually any structure which is suitable for providing a favorable surface for electrical and mechanical contacting and to which the contact points of the electrical conductors of the further cables can then be fastened.

The surface on which a plurality of contact points of the further electrical conductors are arranged next to one another can be, in particular, an upper side of the carrier plate.

The carrier plate is preferably formed in such a way that it has two main surfaces, namely preferably an upper side and a lower side. The carrier plate is preferably formed to be flat so that the height of the circumferential lateral edges is comparatively small.

It has been shown that a particularly suitable connection between the carrier plate formed by the carrier cable and the contact points of the further electrical conductors is produced when the surface, in particular the upper side of the carrier plate, is configured in such a way that a plurality of contact points of the further electrical conductors can be arranged next to one another. The carrier plate is preferably formed in such a way that at least two further electrical conductors can be fastened next to one another on the surface of the carrier plate by their contact points.

Within the scope of the invention, it is also possible that the contact points of two electrical conductors are firstly connected to one another, in particular in such a way that the respective electrical conductors are positioned on top of one another or a pack is formed in such a way that the contact points are stacked on top of one another. In this case, the two contact points of the further electrical conductors preferably contact one another in a planar manner. In this case, it can be provided that the still exposed side of a contact point of one of the two further electrical conductors is fastened on the surface of the carrier plate.

A plurality of contact points of a corresponding number of further electrical conductors are preferably fastened next to one another in a plane on the surface of the carrier plate.

The carrier plate is formed from the electrical conductor, or one of the electrical conductors, of the carrier cable. The electrical conductor can be reshaped accordingly for this in a suitable manner, e.g. in the form of a plate.

The insulation material can preferably be a cable sheath, a dielectric, an insulation material of an individual electrical conductor or another insulator, which surrounds at least one electrical conductor.

The cables of the cable arrangement may have more than one electrical conductor. For example, a cable can comprise two or even more electrical conductors. However, the invention is particularly suitable for cables which have only one electrical conductor. The invention is especially suitable if the electrical conductor is a litz wire. Litz wires, are composed of a plurality, in particular a bundle, of individual strands in a known manner.

The invention is illustrated in more detail below with reference to a configuration in which the cables each have only one electrical conductor, in particular a litz wire. However, the invention is not restricted to such a configuration. The description below should be understood such that the cables can also have more than only one electrical conductor.

The electrical conductor of the respective cable is preferably partially or fully stripped of insulation at the contact point. In particular, it can also be provided that, in addition to an insulation material, electrical shielding, for example a cable shield braid or a cable foil, is also removed so that the at least one electrical conductor is directly accessible for the connection.

Due to the electrical conductor of the carrier cable being formed as a carrier plate at the contact point, it is possible to dispense with a separate carrier plate, for example a separate small connecting plate or welding plate on which the electrical conductors are fastened. By dispensing with an additional component, this enables simpler assembly on the one hand and reduces the material costs on the other. The cable arrangement according to the invention can be configured to be lighter and also more compact at contact points.

The cable arrangement according to the invention is therefore also particularly economical, in particular with regard to mass production.

It is possible to dispense with a solid busbar adapter, in particular for use in high voltage applications in the automobile industry.

The connection or cable connection of the cable arrangement according to the invention can also be referred to as a “connecting point”, “power distributor” or “power distribution node”. When using three electrical cables, i.e. a carrier cable and two further electrical cables which are connected to one another according to the invention, the cable connection can also be referred to as a “Y distributor”.

In a further development of the invention, it can be provided that at least two of the electrical conductors are fastened next to one another and in a plane on the surface of the carrier plate.

It can be advantageous if the contact points of the further electrical conductors are fastened directly on the surface of the carrier plate and/or if two or more contact points of the further electrical conductors are connected to one another and fastened together on the surface of the carrier plate.

Further electrical conductors of further electrical cables can also be mounted on an electrical conductor fastened on the surface of the carrier plate, in particular on an exposed face of its contact point. The choice of which electrical conductors are connected directly to one another and which electrical conductors are connected directly to the carrier plate can be made by the person skilled in the art with regard to the geometric boundary conditions of the cable arrangement. However, it can preferably be provided that most of the electrical conductors are fastened directly on the carrier plate. It can be provided that all electrical conductors of the electrical cables to be connected to one another are fastened directly on the carrier plate.

Within the scope of the invention, it can also be provided that more than one surface of the carrier plate is used for fastening or connecting the electrical conductors. For example, one or more electrical conductors can be fastened on an upper side of the carrier plate and one or more electrical conductors can be fastened on a lower side of the carrier plate which faces away from the upper side.

In a further development of the invention, it can be provided that the contact faces of the electrical conductors are connected to one another, and/or contact faces of the electrical conductors are connected to the carrier plate, with material fit and/or with force fit.

In a further development, it can be provided in particular that the contact faces of the electrical conductor are non-releasably connected to one another, and/or the contact faces of the electrical conductors are non-releasably connected to the carrier plate, preferably via a crimped connection, a soldered connection and/or a welded connection.

In the present case, a non-releasable connection should be understood, in particular, to mean that the connection cannot be nondestructively disconnected. The contact point, also referred to herein as power distribution node, is thus particularly robust with respect to a mechanical and thermal load. A welded connection is preferably provided.

An electrical conductor or a cable core can also be an individual strand, a foil or a mesh. The invention is to be understood such that it is not restricted to being used with a certain type of electrical conductor. However, in particular, a litz wire with a plurality of individual strands can be particularly suitable for forming the carrier plate and/or for fastening the cables.

In a further development, it can be provided, in particular, that the at least one electrical conductor is accessible at a cable end for the connection, i.e. that the contact point is formed at an end of the cable.

All electrical cables of the cable arrangement which are to be connected are preferably connected to one another in the region of their cable ends. However, it can also be provided that one or more of the electrical cables to be connected is or are connected to the further cables via a central region. The at least one electrical conductor can then be accessible for the connection in the central region of the cable having the said conductor, for example with the insulation stripped to form a window In a further development, it can be provided that at least one of the electrical conductors for the mechanical connection is pre-shaped and/or compacted in order to form a preferably planar contact point.

A planar contact point should be understood to mean, in particular, that the electrical conductors for the mechanical connection to a surface of the carrier plate or to a planar contact point of a further conductor forms a flat, preferably level, contact face on at least one side. In this case, it can be provided in particular that the connection between the surface of the carrier plate and/or a contact point of a further electrical conductor is realized as extensively as possible and preferably with little electrical resistance.

An electrical conductor which is formed as a litz wire with a plurality of individual strands is, in particular, suitable for compacting or packing the contact points together.

All litz wires are preferably compacted or packed together in the form of a plate at the contact points.

It is advantageous if the litz wire of the carrier cable is welded, preferably pressure welded, resistance welded or fusion welded in order to form the carrier plate.

Such a configuration has been shown to be particularly suitable for forming the carrier plate in such a way that it enables a suitable surface for connecting further electrical conductors via their contact points.

In a further development, it can be provided that the carrier plate of the carrier cable extends linearly, at a right angle, in a U shape and/or in a T shape in a plan view with respect to the carrier cable longitudinal axis.

Essentially, any geometrical forms of the carrier plate of the carrier cable can be provided. It can also be provided that the carrier plate firstly bends with respect to the carrier cable longitudinal axis, in particular bends orthogonally to the carrier cable longitudinal axis. The carrier plate can also be formed to be circular and/or oval.

A geometry of the carrier plate can preferably be chosen to enable the carrier plate to be suitably fixed on a surrounding structure. To this end, 90° angles, for example, can be advantageous for a preferably form-fitting fastening on a surrounding structure.

The carrier plate is preferably designed in the form of a plate at the end of the carrier cable via a corresponding reshaping of the litz wires of the carrier cable. In this case, the carrier plate has an elongated form starting from the beginning of the carrier plate, i.e. the region of the carrier cable which is not reshaped, up to the end of the carrier plate. In this case, the main axis of the carrier plate is referred to as the longitudinal axis. It can be provided that the carrier plate is preferably angled or bent at the beginning, i.e. at the point at which the litz wires of the carrier cable are not reshaped, so that the longitudinal axis of the carrier plate does not extend parallel to the longitudinal axis of the carrier cable, but at an angle thereto. It has been shown that an angle of 90° is particularly suitable for this. The contact points of the further electrical cable are preferably fastened on the surface of the carrier plate in such a way that the longitudinal axes of the contact points of the further electrical conductors extend orthogonally to the longitudinal axis of the carrier plate. A consequence of this is that, when the carrier plate, starting from the carrier cable, extends at an angle, preferably bent through 90°, both the carrier cable and the further cables which are connected to the carrier cable extend parallel to one another. To produce a cable arrangement, in particular for automotive applications, it has proven particularly suitable to choose a cable connection in which all cables to be connected extend parallel to one another at least in the region of the connection.

In a further development of the invention, a housing, preferably an insulating housing, can moreover be provided, in which the carrier plate is at least partially received.

Instead of an insulating housing, this can also be an electrically conductive housing which optionally shields the power distribution nodes or the carrier plate electromagnetically. A combination of an insulating housing and an electrically conductive housing or a partially electrically conductive housing is also possible.

The use of a housing, in particular an insulating housing, can also be advantageous for fastening the power distribution node or the carrier plate to a surrounding structure, for example the body of a vehicle.

In a preferred further development of the invention, it can be provided that the cables are designed for use in high voltage technology, in particular for use in electric vehicles.

However, the invention is essentially suitable for any applications within electrotechnology as a whole if a power distribution node for data and/or energy transmission is required.

The invention also relates to a method for producing an electrical and mechanical connection between at least three electrical cables of which the electrical conductors are each formed by a litz wire, according to which the cables are firstly freed of insulation material and compacted in the form of a plate in a contact point provided for the connection.

Within the scope of the method according to the invention, it is provided that a cable is formed as a carrier cable, for which the litz wire of the carrier cable is compacted in the form of a plate in such a way that it can be used as a carrier plate for connecting the litz wires of the further cables, whereupon a plurality of litz wires of the further cables are fastened next to one another on a surface of the carrier plate formed in this way.

Due to one of the cables being formed as a carrier cable and a separate carrier plate not being required, the material costs are reduced and the assembly of the cable arrangement is simplified.

The inventor has recognized that, in a simple manner, the litz wires of the carrier cable can be compacted or packed together in the form of a plate in such a way that a carrier plate can be formed, which can then be used to connect the litz wires of the further cables. In this case, the surface of the carrier plate can be configured in such a way that a plurality of litz wires of the further cables can be fastened next to one another. The litz wires can be spaced from one another in this case. The litz wires are preferably fastened only on one side of the carrier plate, for example on the upper side. The carrier plate can preferably be fixed on an insulating part or the like by its underside. It goes without saying that it is essentially also possible to fix litz wires both to the upper side and to the underside of the carrier plate.

Within the scope of the inventive method, it can be provided that only some of the litz wires are fastened next to one another on a surface of the carrier plate. Other litz wires can firstly be fastened on top of one another, in particular in such a way that the contact points of two or more litz wires are connected to one another and, subsequently or at the same time, the contact point of one of the litz wires is fastened on the surface of the carrier plate.

In a further development, it can be provided that the litz wire of the carrier cable is reshaped by pressure welding, friction welding and/or ultrasound compaction so that a carrier plate is formed.

The litz wire of the carrier cable is preferably extensively compacted or packed together in order to preferably generate a solid region similar to a busbar.

The carrier plate of the carrier cable can assume defined forms depending on the outgoing directions of the cable and optionally provided fixing points for assembly on a surrounding structure, for example an insulating part or insulating housing or a body part of a vehicle.

In a further development, it can be provided that the litz wires are electrically and mechanically connected to the carrier plate by fusion welding and/or pressure welding, preferably resistance welding.

Any connecting techniques are essentially conceivable, in particular material-fitting and/or force-fitting connections. The connection is particularly preferably realized by contact welding or resistance welding.

In a further development, it can moreover be provided that all litz wires to be connected are electrically and mechanically connected in a common process, preferably by resistance welding.

The invention can therefore advantageously be used to weld a plurality of cables or their litz wires at once.

The invention is particularly suitable for use in motor vehicles, in particular electric cars.

The invention furthermore relates to the use of a cable arrangement, described above, for implementing a power distribution node in a vehicle, in particular for high voltage technology.

The invention is essentially suitable for cable connections within electrotechnology as a whole. However, the invention can be used particularly advantageously within a so-called HV splitter or power splitter for reliable and simple connection in high voltage on-board power supplies in vehicles. Undesired release of the connection, in particular when power is applied, can be prevented. A space-saving installation is furthermore possible.

It goes without saying that features which have already been described in connection with the inventive cable arrangement can also translate to the inventive method and the inventive use—and vice versa. Advantages which have already been mentioned in connection with the inventive cable arrangement can furthermore also be understood in relation to the inventive method or the inventive use—and vice versa.

In addition, it should be noted that terms such as "comprising", "having" or "with" do not exclude other features of steps. Furthermore, terms such as "a" or "the", which refer to a step or feature in the singular do not exclude a plurality of features or steps—and vice versa.

BRIEF DESCRIPTIONS OF THE DRAWINGS

Exemplary embodiments of the invention are described in more detail below with reference to the drawings.

The figures each show preferred exemplary embodiments in which individual features of the present invention are illustrated in combination with one another. Features of an exemplary embodiment can also be implemented in isolation from the other features of the same exemplary embodiment and can thus be readily linked to features of other exemplary embodiments by the person skilled in the art to give further useful combinations and sub-combinations.

Functionally similar elements are denoted by the same reference signs in the figures, which show, in schematic form:

DETAILED WRITTEN DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
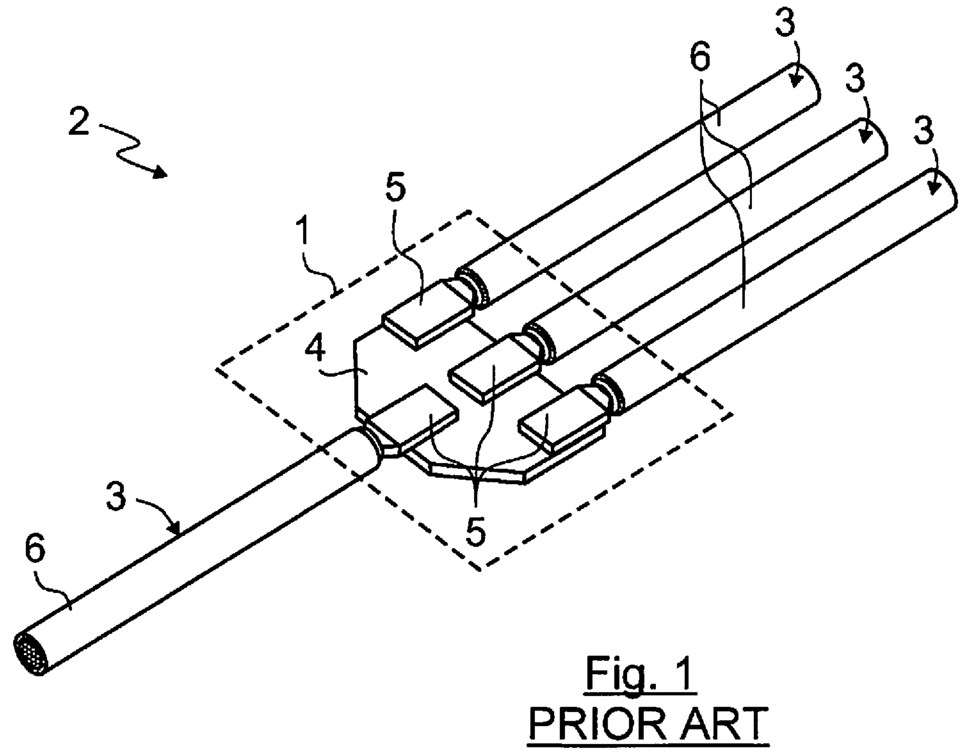
Fig. 1 PRIOR ART
FIG. 1 is a top, side and end perspective view of a cable arrangement with a separate carrier plate according to the prior art.

For better understanding of the invention, FIG. 1 shows a cable connection or a power distribution node 1 of a cable arrangement 2 according to the prior art. The cable arrangement 2 comprises four electrical cables 3, which are electrically and mechanically connected by means of a separate carrier plate 4. For the connection, the electrical conductor 5 of the respective cable 3 is freed of insulation material 6 in the region of the carrier plate 4 and is directly accessible for the connection.

In contrast to the prior art, the inventive cable arrangement 2 according to FIGS. 2 to 6 does not have a separate carrier plate 4.

Figure 2:
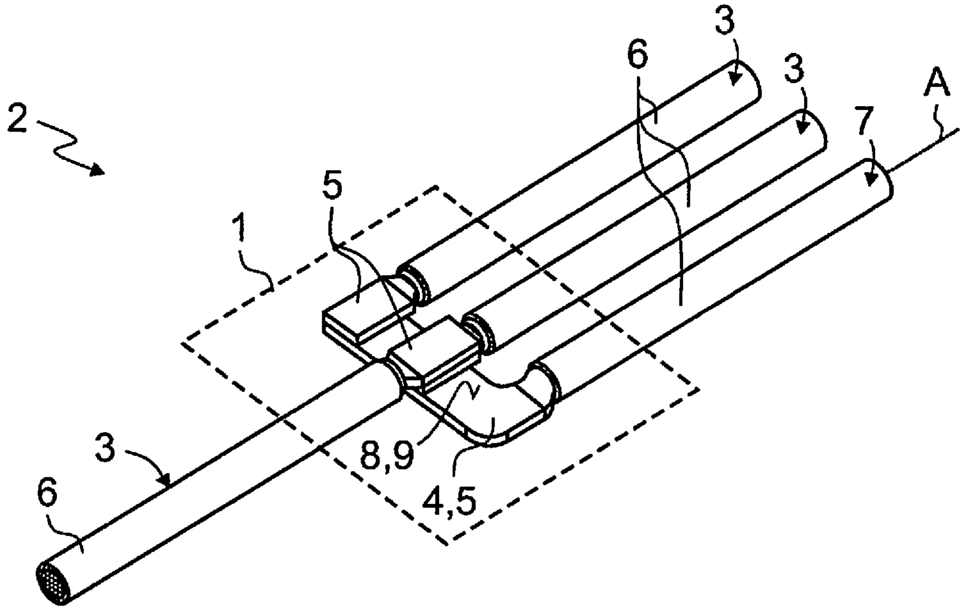
FIG. 2 is a top, side and end perspective view of the inventive cable arrangement according to a first embodiment with a carrier cable and three further cables, wherein two of the cables are arranged stacked.
Figure 3:
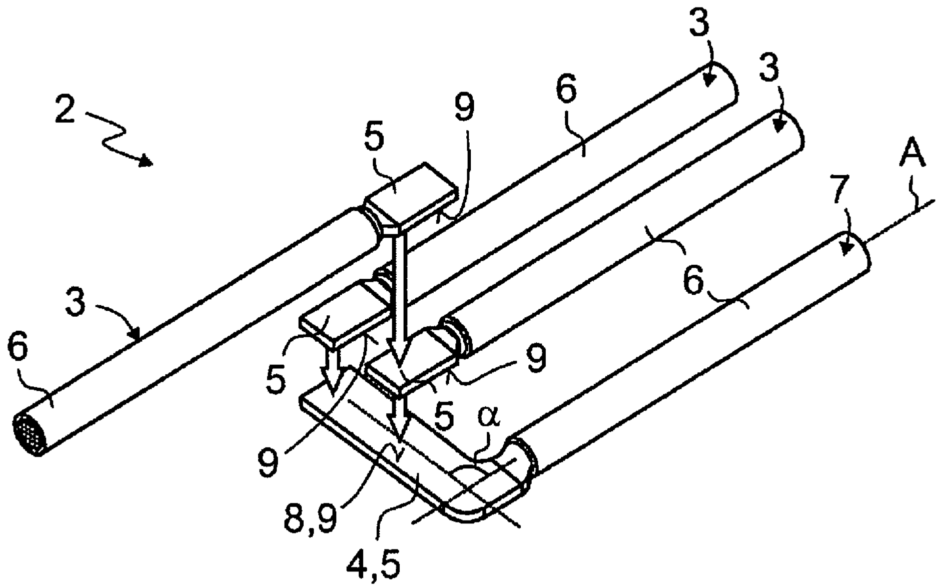
FIG. 3 is a top, side and end perspective view of the inventive cable arrangement of FIG. 2 in an exploded illustration or in a dismantled state.

FIGS. 2 and 3 show a first embodiment of the invention. In this case, FIG. 2 shows an assembled state of the cable arrangement 2, wherein the electrical and mechanical connection of the cable 3 has already been undertaken or the power distribution node 1 has already been formed, whereas FIG. 3 shows an exploded illustration or a dismantled state.

According to the invention, it is provided that one of the cables is configured as a carrier cable 7, wherein the electrical conductor 5 of the carrier cable 7 forms the carrier plate 4.

Apart from the carrier plate 4, the carrier cable 7 can be formed identically to the cables 3.

In the exemplary embodiments, the electrical cables 3 or the carrier cable 7 are formed as single-core cables 3, 7 for simplification. However, this is not to be understood as restrictive. Essentially, one, several or all of the electrical cables 3, 7 can also be formed as a multi-core cable 3, 7, for example they can have two, three, four, five, six or more cores or electrical conductors 5. However, single-core cables 3, 7 can be particularly suitable for use in high-voltage technology, in particular when they have a correspondingly large cross-section.

In the exemplary embodiments, the electrical conductors of the electrical cables 3, 7 are formed continuously as litz wires 5 with a plurality of individual strands. However, it can essentially also be provided that an electrical conductor 5 consists of an individual strand or one or more other conductive materials. However, the use of a litz wire 5 with a plurality of individual strands has proven particularly suitable for enabling the mechanical connection (described in more detail below) of the cables 3, 7 to one another.

Figure 4:
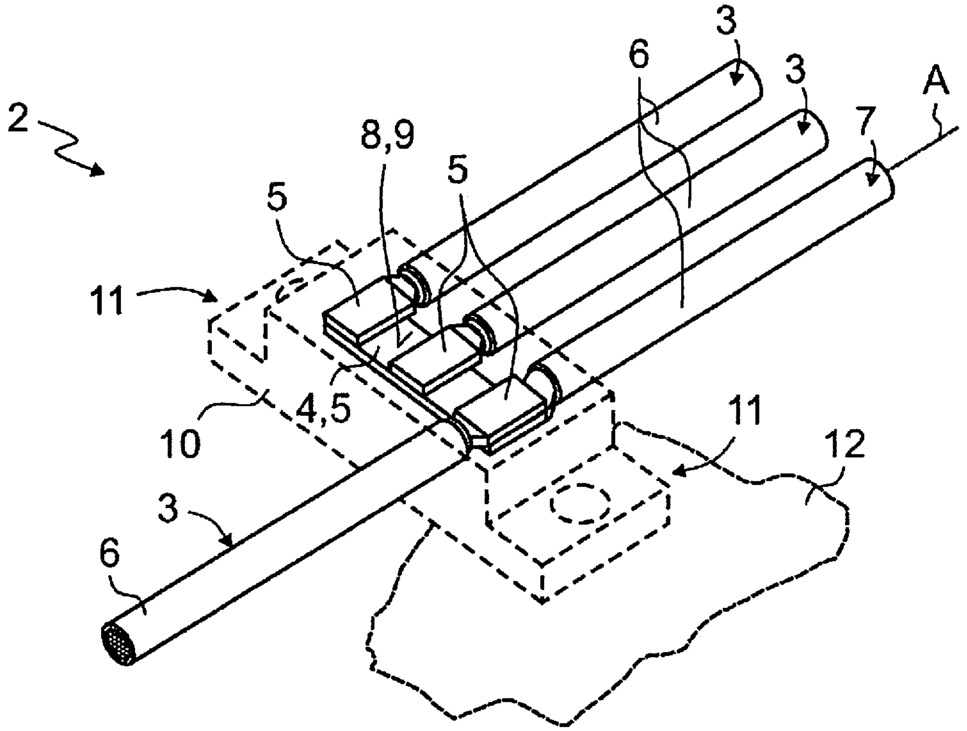
FIG. 4 is a top, side and end perspective view of the inventive cable arrangement according to a second embodiment within a housing, wherein all cables are fastened directly to the carrier plate.

In the exemplary embodiment of FIGS. 2 and 3, the litz wires 5 of two cables 3 are fastened directly on a surface 8 of the carrier plate 4. A further litz wire 5 of the remaining fourth electrical cable 3 is, on the other hand, connected to the litz wire 5 of one of the other cables 3. The two cables 3 form a stack. It can therefore also be provided that the cables 3 are electrically and mechanically connected by means of the carrier plate 4, wherein not all litz wires 5 of the electrical cables 3 are connected directly to the carrier plate 4. The litz wires 5 of the electrical cables 3 can also be connected to one another. Within the scope of the invention, it is provided that a plurality of litz wires 5, preferably at least two litz wires 5, are fastened next to one another on the surface 8 of the carrier plate 4. The litz wires arranged next to one another on a surface 8 of the carrier plate which is formed as an upper side are arranged next to one another in a plane, possibly at a spacing from one another. It is essentially possible that, as illustrated in FIG. 4, all litz wires 5 are arranged next to one another in a plane. However, it is also possible to stack some of the litz wires on top of one another, as illustrated with the aid of two litz wires 5 in FIGS. 2 and 3. The decision as to how the power distribution node 1 is to be configured can be made by the person skilled in the art depending on the geometric requirements.

The mechanical connection of the litz wires 5 to one another and/or the litz wires 5 to the carrier plate 4 can essentially be formed with material fit and/or with force fit.

The mechanical connection of the litz wires 5 to one another and/or the litz wires 5 to the carrier plate 4 is preferably configured to be non-releasable.

The mechanical connection can be configured, for example, as a crimped connection, soldered connection and/or welded connection. In this case, the litz wires 5 can be electrically and mechanically connected by means of the carrier plate 4 by fusion welding and/or pressure welding, preferably resistance welding. In this case, all litz wires 5 to be connected are particularly preferably electrically and mechanically connected in a common process.

In the exemplary embodiments, it is provided that the litz wires 5 for the mechanical connection are pre-shaped and/or compacted in order to form a planar contact point 9 (c.f. in particular FIG. 3). This can take place, for example, by pressure welding, friction welding and/or ultrasound compaction. So-called "compacting" or "packing" can be undertaken particularly advantageously if the electrical conductors 5 are formed as litz wires with a plurality of individual strands. The individual strands can then be shaped and/or pressed together with material fit and/or with force fit to form the planar contact point 9 by means of a corresponding welding technique or in some other manner.

The carrier plate 4 of the carrier cable 7 can essentially have any geometry. In the exemplary embodiments of FIGS. 2 and 3, the carrier plate 4 of the carrier cable 7 extends at a right angle corresponding to the angle $\alpha=90°$ (c.f. FIG. 3) in a plan view with respect to the carrier cable longitudinal axis A. However, the angle $\alpha$ can essentially be any angle. Further, more complex geometrical forms are also possible, of which a few more will be specified by way of example below.

An inventive method for producing an electrical and mechanical connection of the cable arrangement 2 can be provided in that the litz wires 5 of the cables 3, 7 are firstly stripped of insulation or freed of the insulation material 6, e.g. a cable sheath, and are made directly accessible for the connection, according to which the litz wires 5 are pre-shaped and/or compacted to form a planar contact point 9. In this case, the litz wires 5 of the carrier cable 7 can be processed in such a way that they form a carrier plate 4, wherein the litz wires 5 of the further cables 3 are then connected to one another by means of the carrier plate 4.

FIG. 4 shows a further embodiment, which essentially resembles the embodiment of FIGS. 2 and 3, wherein all litz wires 5 of the further cables 3 are now connected directly to the carrier plate 4. FIG. 4 furthermore indicates a housing 10, in which or on which the carrier plate 4 of the cable connection or the power distribution node 1 is received. The housing 10 has fastening means 11 for fastening a surrounding structure, in the present case comprising two webs with respective bores for receiving a screw, for example. The power distribution node 1 can be fastened to a body part 12 of a vehicle, for example, by means of the housing 10.

The housing 10 can be any housing 10, for example an insulating housing or an electrically conductive housing for electromagnetic shielding of the power distribution node 1.

Figure 5:
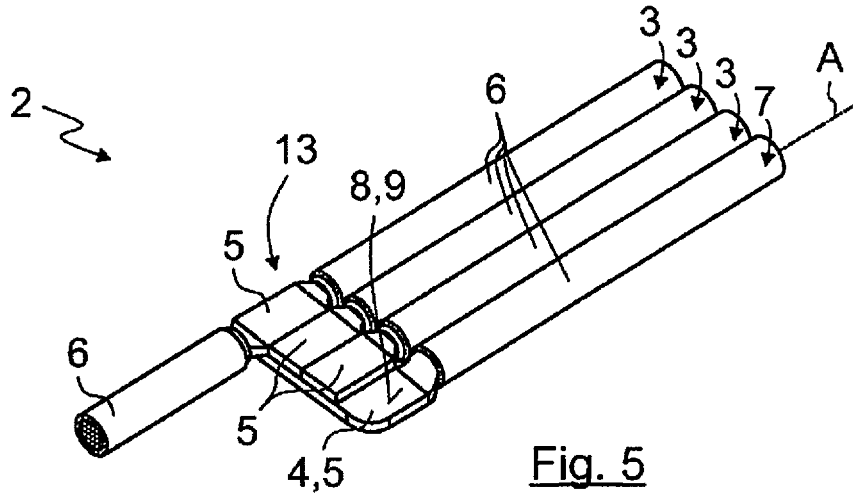
FIG. 5 is a top, side and end perspective view of the inventive cable arrangement according to a third embodiment with a tight packing density, wherein one of the cables is fastened to the carrier plate by a central region.

An embodiment similar to the embodiment of FIG. 4 is shown in FIG. 5. In this case the packing density of the cable connection on the carrier plate 4 is increased in that the litz wires 5 of the cables 3 are fastened adjacent to one another on the carrier plate 4. The exemplary embodiment of FIG. 5 furthermore demonstrates that the litz wires 5 do not necessarily have to be accessible for the connection at a cable end. For example, the litz wire 5 in the cable 3 which is spaced furthest away from the carrier cable 7 in FIG. 5 is stripped of insulation in a central region 13 of the cable 3 in the manner of a window in order to make the litz wire 5 accessible for the connection. However, the electrical cables 3 are preferably connected to one another in the region of their cable ends, as illustrated in the other exemplary embodiments.

Figure 6:
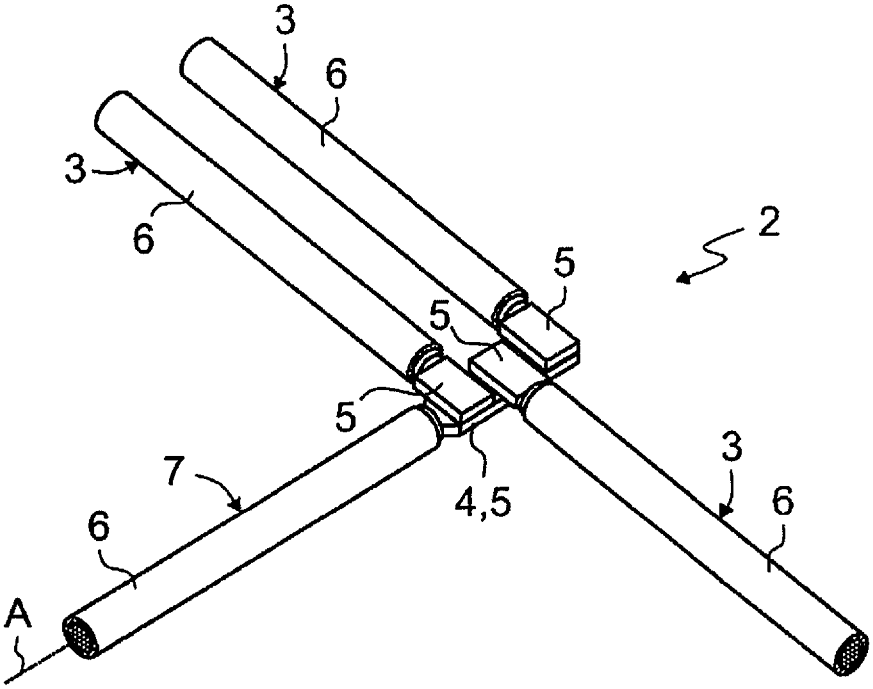
FIG. 6 is a top, side and end perspective view of the inventive cable arrangement according to a fourth embodiment with a linear carrier plate and different outgoing directions of the cable.

A carrier plate which deviates from the previous geometry of the carrier plate 4 is illustrated by way of example in FIG. 6. In the exemplary embodiment of FIG. 6, the carrier plate 4 extends linearly with respect to the carrier cable longitudinal axis A. The electrical cables 3 to be connected by means of the carrier plate 4 furthermore extend in different outgoing directions.

Figure 7:
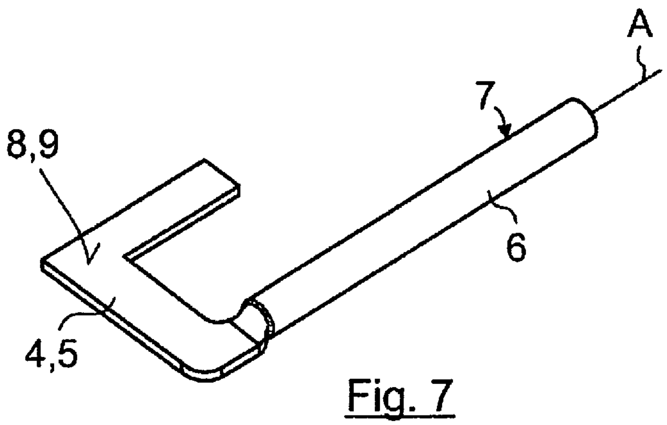
FIG. 7 is a top, side and end perspective view of a carrier cable with an L-shaped carrier plate.
Figure 8:
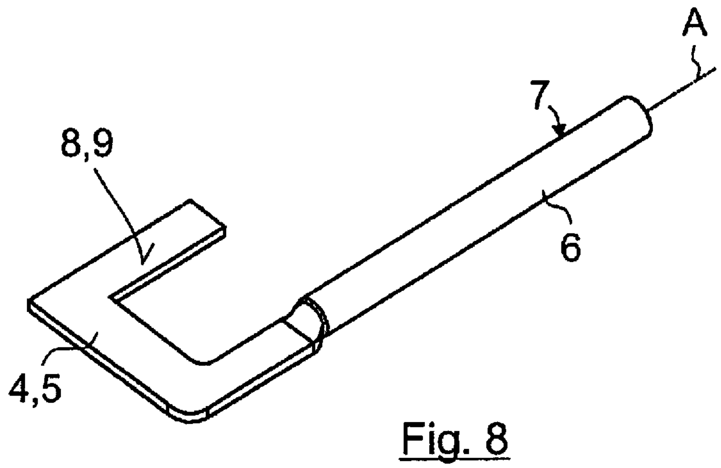
FIG. 8 is a top, side and end perspective view of a carrier cable with a U-shaped carrier plate.
Figure 9:
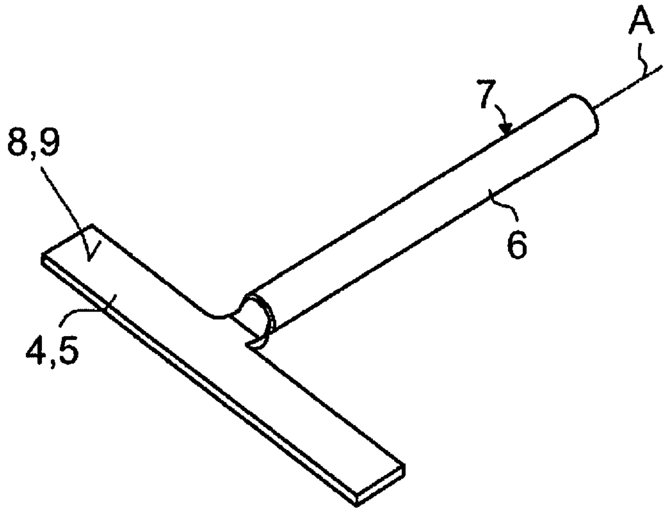
FIG. 9 is a top, side and end perspective view of a carrier cable with a T-shaped carrier plate.

As already mentioned, the geometry of the carrier plate 4 can be essentially any geometry depending on the requirements of the cable arrangement 2. In particular, form-fitting fixing of the carrier cable 4 in a surrounding housing 10 can be realized in a simple manner in the case of an angled carrier plate 4. FIGS. 7 to 9 serve to illustrate further—purely exemplary—geometries of the carrier plate 4. FIG. 7 shows an L-shaped carrier plate 4, FIG. 8 a U-shaped carrier plate 4 and FIG. 9 a T-shaped carrier plate 4. It can essentially also be provided that the carrier plate 4 is angled "upwards" or "downwards" with respect to the carrier cable longitudinal axis A and the views shown in the figures, preferably orthogonally to the carrier cable longitudinal axis A.

The cable arrangement 2 according to the invention can be advantageously arranged in a vehicle, in particular in an electric vehicle, and connected in particular to a body part 12 of the vehicle.

A cable arrangement (2) for producing an electric and mechanical connection comprising at least three electrical cables (3, 7) each of which have an electrical conductor (5), and which are electrically and mechanically connected to one another, wherein the electrical conductor of each of the at least three electrical cables is freed of insulation material (6) and shaped in the form of a plate at a contact point; (9), characterized in that one of the at least three electrical cables (3, 7) is configured as a carrier cable (7) and the electrical conductor (5) of the carrier cable (7) is formed as a carrier plate (4) at the contact point (9) for connecting the contact points (9) of the further electrical conductors (5), wherein a plurality of contact points (9) of the further electrical conductors (5) are fastened next to one another on a surface (8) of the carrier plate (4).

A cable arrangement (2) wherein the contact points (9) of the further electrical conductors (5) are fastened directly on the surface (8) of the carrier plate (4) and/or in that two or more contact points (9) of the further electrical conductors (5) are connected to one another and fastened together on the surface (8) of the carrier plate (4).

A cable arrangement (2) wherein the contact surfaces (9) of the electrical conductors (5) are connected to one another, and/or the contact surfaces (9) of the electrical conductors (5) are connected to the carrier plate, with material fit and/or with force fit.

A cable arrangement (2) wherein the contact surfaces (9) of the electrical conductors (5) are non-releasable connected to one another, and/or the contact surfaces (9) of the electrical conductors (5) are non-releasable connected to the carrier plate (4), preferably via a crimped connection, a soldered connection and/or a welded connection.

A cable arrangement (2) wherein the electrical conductors are formed as litz wires (5), each with a plurality of individual strands.

A cable arrangement (2) wherein the litz wires (5) are compacted in the form of a plate at the respective contact point.

A cable arrangement (2) wherein the litz wire (5) of the carrier cable (7) is welded, preferably pressure welded, resistance welded or fusion welded, in order to form the carrier plate (4).

A cable arrangement (2) and wherein the carrier plate (4) of the carrier cable (7) electrically communicates with and extends linearly, at a right angle, in a U shape and/or in a T-shape in a plan view with respect to the carrier-cable longitudinal axis (A).

A cable arrangement (2) further comprising a housing, and the carrier plate (4) is at least partially received within the housing, and the housing may be formed of an insulating material.

A cable arrangement (2) wherein the at least three electrical cables (3, 7) are designed for use with high-voltage technology.

A method for producing an electrical and mechanical connection between at least three electrical cables, the method comprising the steps: (3, 7) providing at least three electrical cables, each of the at least three electrical cables formed by a litz wire; providing an electrical conductor on each of the at least three electrical cables by firstly freeing of insulation material a predetermined portion of each of the at least three electrical cables (5), and compacting the predetermined portion of each of the least three electrical cables that is freed of insulation material (6) into the form of a plate at a contact point (9) provided for the connection; providing a carrier cable from one of the at least three electrical cables and, the litz wire (5) of the carrier cable (7) is compacted in the form of a plate in such a way that the compacted plate of the carrier cable can be used as a carrier plate (4); and connecting the litz wires (5) of the further cables of the at least three electrical cables (3 next to one another on a surface (8) of the carrier cable carrier plate (4).

A method wherein the carrier plate (4) of the carrier cable is formed/reshaped by a welding process, such as, but not limited to pressure welding, friction welding and/or ultrasound compaction.

A method wherein the litz wires (5) of the further electrical cables (3) are electrically and mechanically connected to the carrier plate (4) by a method such as, but not limited to, fusion welding and/or pressure welding, preferably resistance welding.

A method wherein all litz wires (5) to be connected are electrically and mechanically connected in a common process, which may be, but is not limited to resistance welding.

A cable arrangement (2) and wherein two or more contact points of the further electrical conductors are connected to one another and fastened together on the surface of the carrier plate (4).

A cable arrangement (2) and wherein the contact surfaces of the electrical conductors (3) are connected to one another with material fit and/or with force fit.

A cable arrangement (2) and wherein the contact surfaces of the electrical conductors are non-releasably connected to one another.

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalence.

The invention claimed is:

1. A cable arrangement for producing an electric and mechanical connection comprising:
- at least three electrical cables each of which have an electrical conductor and, wherein the electrical conductor of each of the at least three electrical cables is freed of insulation material and shaped in the form of a plate at a contact point; and
- the electrical conductors of each of the at least three electrical cables are litz wires, each litz wire comprising a plurality of individual strands; and
- one of the at least three electrical cables is a carrier cable and the electrical conductor of the carrier cable is formed as a carrier plate at the contact point; and
- the plate contact points of the electrical conductors of the electrical cables, other than the carrier cable, are fastened next to one another directly on a surface of the carrier plate of the carrier cable; and
- the plate contact points of the electrical conductors of the electrical cables, other than the carrier cable, are directly in contact with the carrier plate of the carrier cable.

2. The cable arrangement as claimed in claim 1, and wherein the contact points of the further electrical conductors are fastened directly on the surface of the carrier plate.

3. The cable arrangement as claimed in claim 1 and wherein the contact surfaces of the electrical conductors are connected to the carrier plate, with material fit and/or with force fit.

4. The cable arrangement as claimed in claim 1 and wherein the contact surfaces of the electrical conductors are non-releasably connected to the carrier plate.

5. The cable arrangement as claimed in claim 1, and wherein the litz wires are compacted in the form of a plate at the respective contact point.

6. The cable arrangement as claimed in claim 1 and wherein the litz wire of the carrier cable is welded, to form the carrier plate.

7. The cable arrangement as claimed in claim 1 and wherein the carrier plate of the carrier cable electrically communicates with and extends outwardly relative to a longitudinal axis of the carrier-cable.

8. The cable arrangement as claimed in claim 1 and further comprising:

a housing, and the carrier plate is at least partially received within the housing.

9. The cable arrangement as claimed in claim 8 and wherein the housing is formed of an insulating material.

10. The cable arrangement as claimed in claim 1 and wherein the at least three electrical cables are for use with high voltage.

11. A method for producing an electrical and mechanical connection between at least three electrical cables, the method comprising the steps:

providing at least three electrical cables, each of the at least three electrical cables formed by a litz wire and wherein each litz wire comprises a plurality of individual strands;

providing an electrical conductor on each of the at least three electrical cables by firstly freeing of insulation material a predetermined portion of each of the at least three electrical cables and compacting the insulation material freed predetermined portion of each of the least three electrical cables into a plate at a contact point;

providing a carrier cable from one of the at least three electrical cables and, the litz wire of the carrier cable is compacted in the form of a plate in such a way that the compacted plate of the carrier cable is a carrier plate; and connecting the plate contact point of each of the electrical conductors of each of the electrical cables, other than the carrier cable, next to one another directly on a surface of the cable plate of the carrier cable; and wherein the plate contact points of the electrical conductors of the electrical cables, other than the carrier cable, are directly in contact with the carrier plate of the carrier cable.

12. The method as claimed in claim 11, and wherein the carrier plate of the carrier cable is formed by welding.

13. The method as claimed in claim 11 and wherein the further electrical cables are electrically and mechanically connected to the carrier plate.

14. The method as claimed in claim 11 and wherein all litz wires to be connected are electrically and mechanically connected in a common process.

15. The cable arrangement as claimed in claim 1, and wherein two or more contact points of the further electrical conductors are connected to one another and fastened together on the surface of the carrier plate.

16. The cable arrangement as claimed in claim 1 and wherein the contact surfaces of the electrical conductors are connected to one another with material fit and/or with force fit.

17. The cable arrangement as claimed in claim 1 and wherein the contact surfaces of the electrical conductors are non-releasably connected to one another.

18. The cable arrangement as claimed in claim 1 and the carrier plate of the carrier cable electrically communicates with and extends outwardly linearly relative to a longitudinal axis of the carrier-cable.

19. The cable arrangement as claimed in claim 1 and the carrier plate of the carrier cable electrically communicates with and extends outwardly angularly relative to a longitudinal axis of the carrier-cable.

20. The cable arrangement as claimed in claim 1 and the carrier plate of the carrier cable electrically communicates with and extends outwardly in a U shape relative to a longitudinal axis of the carrier-cable.

21. The cable arrangement as claimed in claim 1 and the carrier plate of the carrier cable electrically communicates with and extends outwardly in a T shape, in a plan view, relative to a longitudinal axis of the carrier-cable.

22. A cable arrangement for producing an electric and mechanical connection comprising:

at least three electrical cables each of which have an electrical conductor and, wherein the electrical conductor of each of the at least three electrical cables is freed of insulation material and shaped in the form of a plate at a contact point;

one of the at least three electrical cables is a carrier cable and the electrical conductor of the carrier cable is formed as a carrier plate at the contact point; and the plate contact points of the electrical conductors of the electrical cables, other than the carrier cable, are fastened next to one another directly on a surface of the carrier plate of the carrier cable; and the electrical conductors of the at least three electrical cables are litz wires, each litz wire having a plurality of individual strands; and wherein the carrier plate of the carrier cable is formed solely from the plurality of individual strands of the litz wire.

* * * * *